Figure 1:
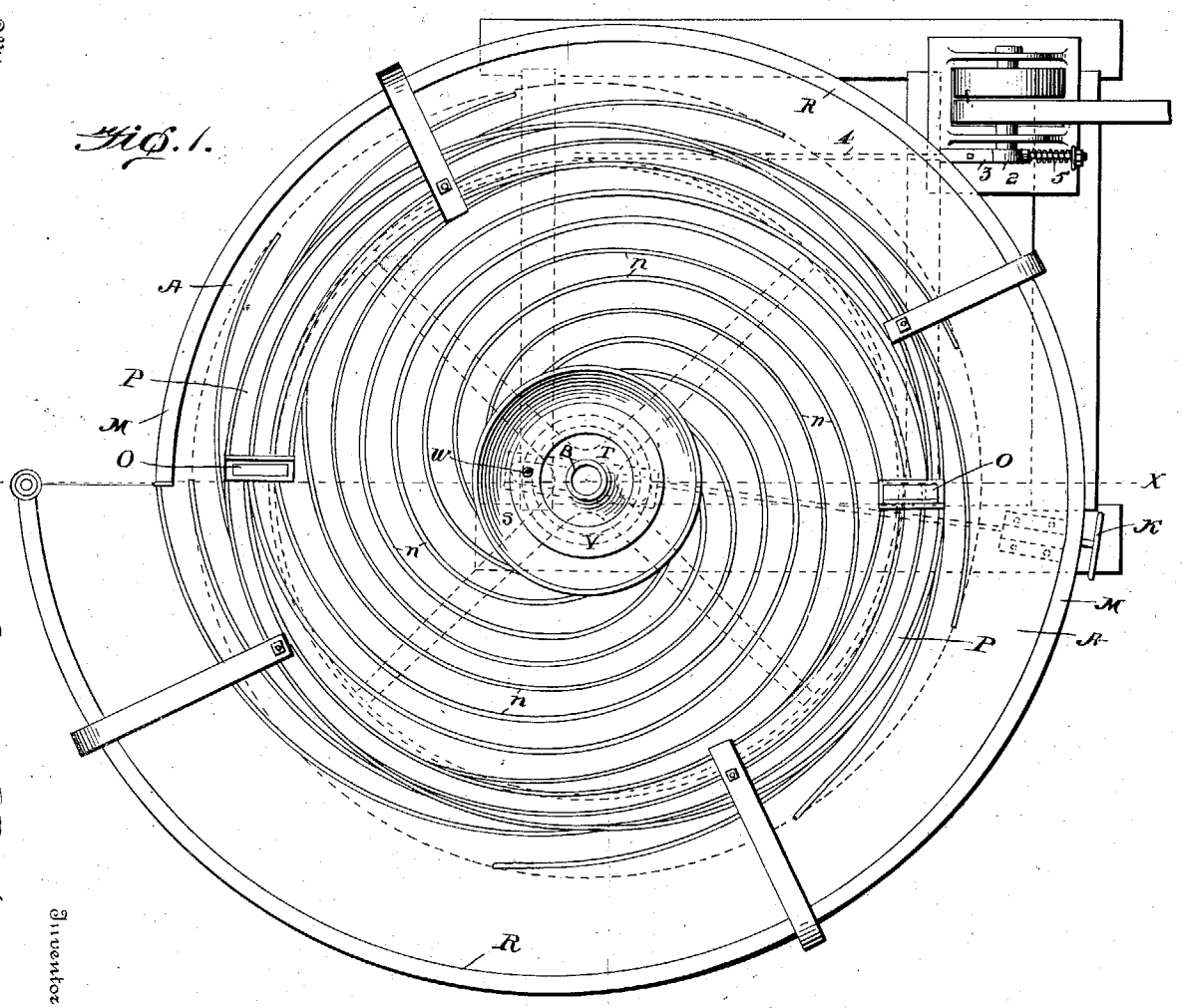

No. 12,590. REISSUED JAN. 8, 1907.

J. W. PINDER.

ORE CONCENTRATOR.

APPLICATION FILED FEB. 28, 1906.

3 SHEETS—SHEET 1.

Witnesses
B. M. Offutt
C. W. Fowler

Inventor
Joseph W. Pinder
By George H. Strong
his Attorney

No. 12,590. REISSUED JAN. 8, 1907.
J. W. PINDER.
ORE CONCENTRATOR.
APPLICATION FILED FEB. 28, 1906.
3 SHEETS—SHEET 2.
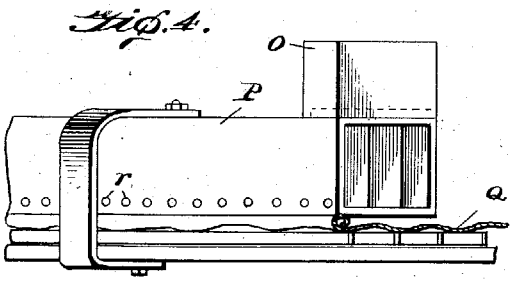
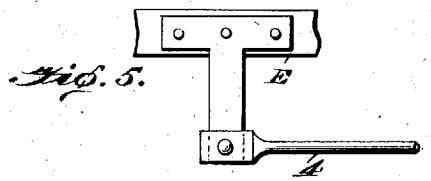
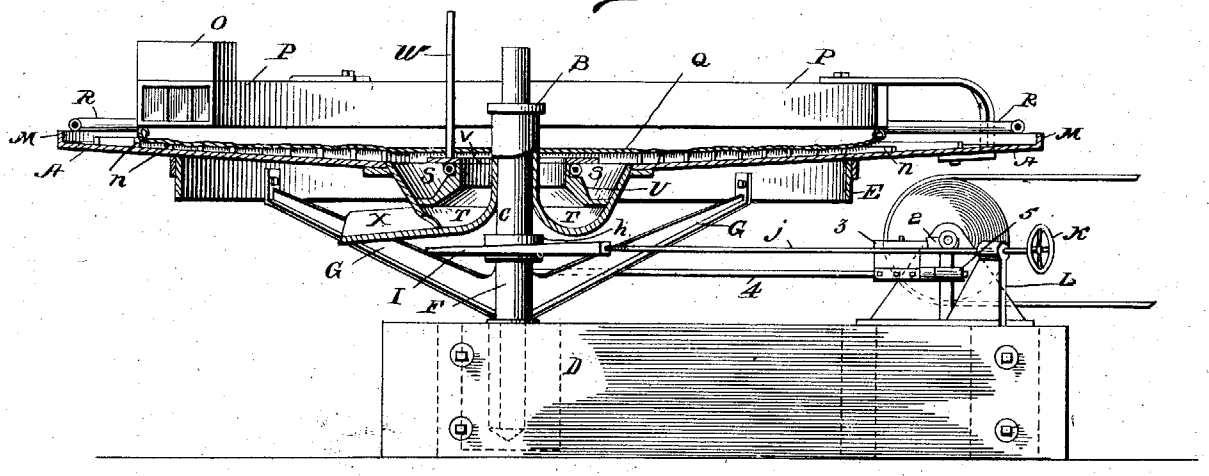
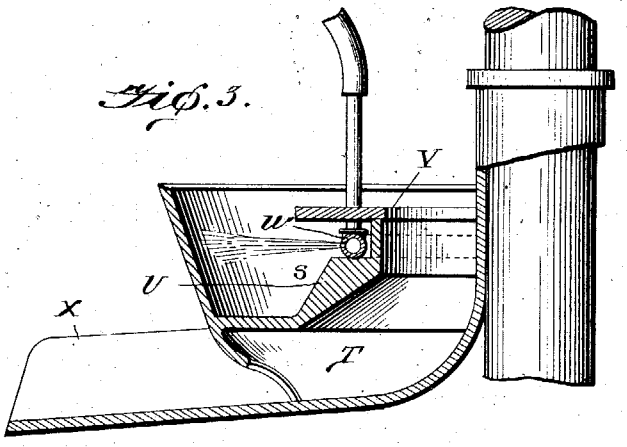
Witnesses
B. M. Offutt
E. M. Pinder
Inventor
Joseph W. Pinder
By George H. Strong
Attorney No. 12,590. REISSUED JAN. 8, 1907.

J. W. PINDER.

ORE CONCENTRATOR.

APPLICATION FILED FEB. 28, 1906.

3 SHEETS—SHEET 3.

Witnesses

B. M. Offutt.

C. W. Fowler

Inventor

Joseph W. Pinder

By George H. Strong

Hie

Attorney

UNITED STATES PATENT OFFICE.

JOSEPH W. PINDER, OF SAN FRANCISCO, CALIFORNIA.

ORE-CONCENTRATOR.

No. 12,590. Specification of Reissued Letters Patent. Reissued Jan. 8, 1907.

Original No. 744,229, dated November 17, 1903. Application for reissue filed February 28, 1906. Serial No. 264,201.

*To all whom it may concern:*

Be it known that I, JOSEPH W. PINDER, a citizen of the United States, residing in the city and county of San Francisco, State of California, have invented certain new and useful Improvements in Ore-Concentrators; and I do hereby declare the following to be a full, clear, and exact description of said invention, such as will enable others skilled in the art to which it most nearly appertains to make, use, and practice the same.

My invention relates to that class of ore-concentrators for separating and saving the heavy particles of metal contained in earthy deposits or ore-pulp in which a shallow pan or concave table is mounted on a central vertical shaft and connected with operating mechanism by which a reciprocating rotary motion accompanied with a jolt or jar at the termination of each reciprocation is imparted to the pan or table.

My improvements relate to the surface construction of the pan or table, whereby the separation and concentration of the heavy particles are accomplished; and it consists principally in the arrangement of spiral riffles on the upper surface of the pan or table, whereby the motion and jar of the pan compel the particles to work in a circle outward toward the periphery of the pan and between rather than athwart the riffles, whereby the particles are not wholly arrested in their progression, and the invention also comprehends making the pan evolute in outline, whereby different points on the perimeter travel at different rates of speed and the sulfurets in one stage of concentration are subjected to a different shake than those in another stage of concentration on another part of the table. In connection with this riffle and table construction I combine a system of pulp-distribution and water-spraying devices by which the separation and cleaning of the particles are accomplished during their travel. It also includes a central trap or basin of peculiar construction for the purpose of catching and saving any escaping mercury or amalgam that may pass downward over the riffles, all as hereinafter more fully described.

Figures 6, 7, 8:
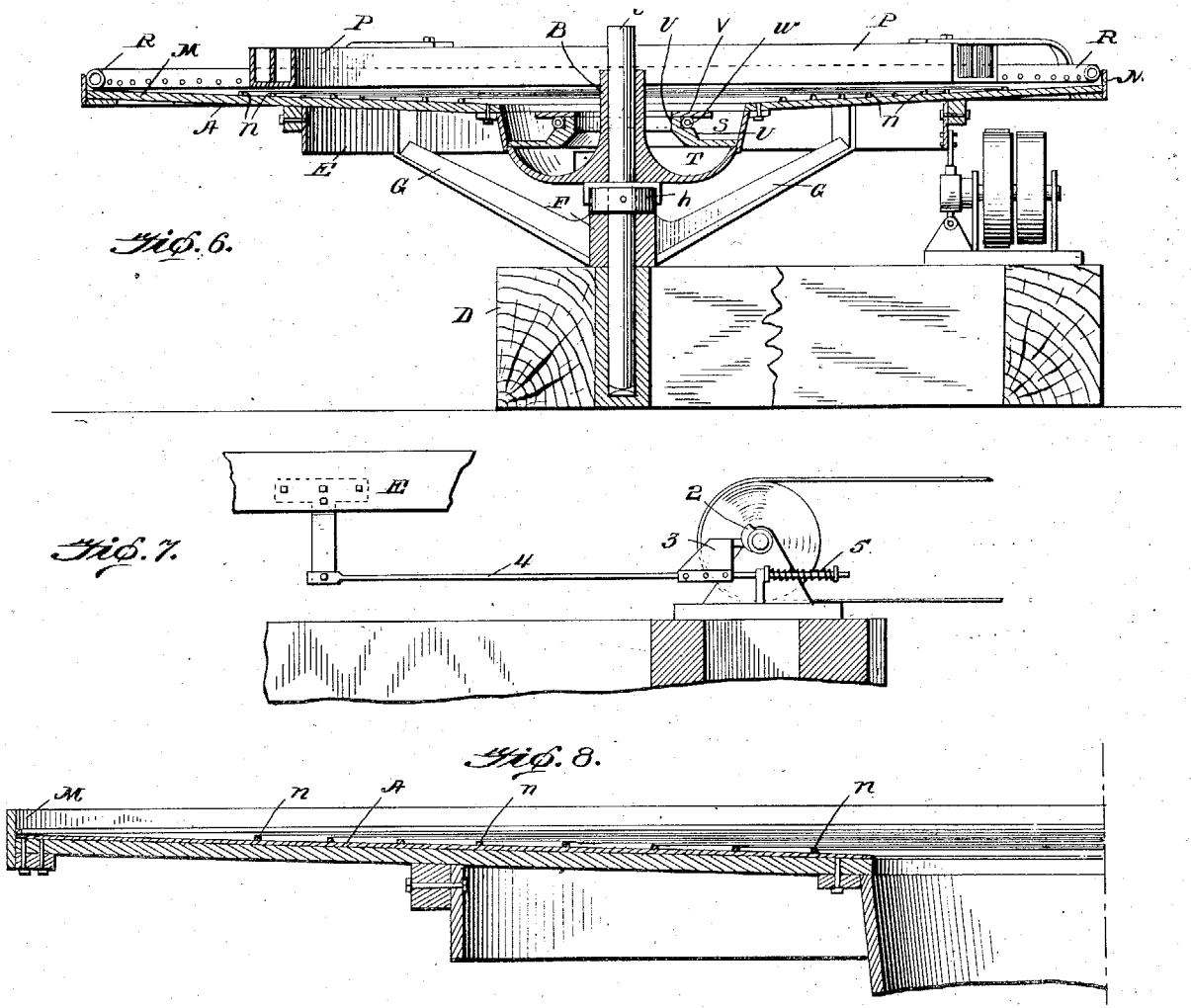

Referring to the accompanying drawings, Figure 1 is a plan view of my pan or table. Fig. 2 is a vertical section of the pan, taken through the line *x x*, Fig. 1. Fig. 3 is an enlarged sectional view of the central trap or basin. Fig. 4 is an enlarged perspective view of a section of the distributing-trough, and Fig. 5 is a side view of the connection of the reciprocating rod with the depending rim of the pan. Fig. 6 is a cross-section of the pan and its support, taken at a right angle to *x x*, Fig. 1. Fig. 7 is a side view of the actuating mechanism, and Fig. 8 is a partial vertical section showing the construction of the pan.

Let A represent a circular pan or table which is slightly concave on its upper surface. The bottom or floor of this pan or table may be made solid and fixed or it may be made of independent triangular-shaped sections with their widest portions at the outer rim and their apices at the center. I prefer to make it of these independent sections, so that the incline or concavity of the upper surface of the pan can be varied and regulated, as hereinafter described. This floor when made solid can be supported directly from a central socket B, which fits over and rests upon the upper end of a stationary spindle C. This latter spindle is fixed in and secured to the framework or base D, upon which the pan is mounted; but when the floor is made up of independent triangular sections, as above specified, it is supported on a shallow vertical rim E, which extends around underneath the floor of the pan at a point between the middle and outer edges of the sections. This rim is then supported by bracing-arms G from a loose sleeve F, so that by raising or lowering the sleeve on the spindle the center or apex ends of the floor-sections can be raised or lowered like an umbrella, and thus vary the pitch or incline of the floor. To provide for raising or lowering this sleeve, I form or secure to it a collar *h*, in the outer face of which is a circular groove. A wedge-shaped bar I then enters this groove and is connected by a rod *j* with a hand-wheel K. The outer end of the rod is threaded and passes through a threaded hole in a block L, which forms a part of the framework or base, so that by turning the hand-wheel the wedge can be moved back or forth, and thus raise or lower the sleeve.

The outer edge of the pan A has the form of an evolute, so as to carry its rim on one side outward to a distance, and the terminus of this evolute is connected in a straight or radial line *a* with the commencement of the evolute. A shallow rim M passes entirely around this evolute edge except the straight radial portion above described, which forms the point of discharge for the sulfurets.

The floor of the pan should be perfectly smooth before the riffles are applied, and when I use the independent triangular sections I cover and stretch tightly over it some smooth material, preferably linoleum.

In the central portion of the pan surrounding the supporting-socket I construct my improved amalgam-trap, which will be hereinafter described. Commencing at the outer edge of this amalgam-trap, I then secure upon the smooth bottom of the pan a series of shallow riffles *n n n*, which are made in evolute form and here shown as terminating at different points at regular intervals on the same outer circle at the outer edge of the concentrating part of the pan, so that the space between each two riffles will discharge its burden at a separate interval into the outer track at the periphery of the pan, which leads to the point of discharge. These riffles, it will be observed, open out or expand around the pan in the direction in which the concentrates are to travel. This permits the concentrates to move between rather than across the riffles, thereby preventing their banking up behind the riffles.

The pulp is distributed at proper intervals on the table and at points proximate to the outer ends of the riffles by means of the distributing-troughs P P, which are supported on brackets *p p* from the outer edge of the table. The material for distribution is delivered to troughs P P through the boxes O O. Secured to the outer lower corners of the troughs is a carpet Q, with its nap side down, and this carpet passes loosely over and rests upon the top of all the riffles down to the amalgam-trough. The ore-pulp is fed through holes *r r* in the outer side of the distributing-troughs P, so as to pass underneath the carpet as it flows downward over the riffles toward the center of the table. A water-pipe R surrounds the outer edge of the pan lying just above the shallow rim M, and this pipe is perforated on its inner side, so as to cast a spray of numerous jets of clear water upon the outer edge of the table. This water passes down the floor and carries the pulp over the riffles and underneath the carpet. At the same time a jigging motion is imparted to the pan by mechanism hereinafter described, by which the light and heavy particles are caused to be separated by the combined action of the riffles, the flow of water, and the motion, so that the heavy particles will settle between the riffles according to their specific gravity and be carried around between the riffles by the movement of the pan and be delivered into the outer discharge-track, whence they are carried to the discharge-opening of the pan. The water continually flowing downward carries the lighter particles toward the center discharge and trap, and the sweeping action of the carpet as the pulp flows underneath it causes its nap to gather any fine floating particles or slimes that may come in contact with it until they aggregate or become saturated sufficiently to sink of their own gravity.

The amalgam-trap consists of two compartments—to wit, an outer shallow compartment or trough S—into which the overflowing tailings are first received. This compartment or trough is separated from the discharge-compartment T by a partition U, which is somewhat lower than the outer edge of the trough S, so that the tailings will overflow the partition into the discharge-compartment T. The partition U has a narrow horizontal shelf V projecting over it into the trough S, and a perforated water-pipe W extends around under this shelf into the trough. The action of this spray is to cause an ebullition in the trough and a consequent eddy below the pipe, so that any amalgam or mercury that enters the trough will be settled and caught, while the light and worthless portions will overflow the partition into the discharge-compartment T and pass off through the waste-spout X.

The motion which I impart to the pan or table is a slow motion in one direction and a quick motion or jolt in the opposite direction. This is accomplished by means of a cam 2, acting upon a tappet 3, which is attached to the actuating-rod 4. This is a horizontally-sliding rod, the opposite end of which is connected with the vertical rim E, as shown at Fig. 5, or it may be connected with some other part of the pan. The cam 2 pushes the rod slowly in one direction until the tappet is released from the end of the cam, when a spring 5 on the outer end of the rod gives it a quick return motion, accompanied with a jar, which motion being imparted to the table causes the heavy particles which are caught between the riffles to travel outward by reaction in the path of the riffles until they are discharged in regular order at the end of the discharge-track.

This pan will separate and concentrate the heavy particles in a clean condition and they will be delivered by the evolute riffles in the order of their specific gravity. The carpet or other fabric will sweep the surface of the flowing pulp clear of floating particles of value and hold them until they are in a condition to settle and be caught by the riffles, while the amalgam-trough will catch and save any particles of mercury or amalgam that attempt to escape through the depressed center of the pan.

Having thus described my invention, what I claim, and desire to secure by Letters Patent, is—

1. A concentrating pan or table having a concave upper surface mounted on a center support that permits it to oscillate in a horizontal plane: a mercury and amalgam trap at the center of said table: spiral or evolute riffles secured to the upper surface of said table and terminating at stated intervals on the same circle near the outer periphery of the pan: distributing-boxes adapted to deliver the pulp at or near the outer edge of the series of riffles: means for imparting to said pan an oscillatory motion: and a perforated water-pipe surrounding the outer edge of the pan or table, substantially as above described.

2. A concentrating pan or table having a concave upper surface, the circumference of said pan having the form of an evolute: a central support for the pan which permits it to oscillate in a horizontal plane: a mercury and amalgam trap at the center of said pan: spiral or evolute riffles secured upon the bottom of the pan and terminating at their outer ends at intervals on the same circle near the outer edge of the pan: distributing-boxes adapted to deliver the pulp at the outer edge of the riffles: a water-pipe surrounding the outer edge of the pan and adapted to deliver a spray of clear water upon the outer edge of the table and means for imparting to the pan a rotary oscillation in a horizontal plane, substantially as described.

3. In a concentrating-pan having a concave upper surface, spiral or evolute riffles terminating at intervals on the same circle near the outer edge of the pan: a track surrounding said riffles on the outer periphery of the pan: means for imparting to the pan a slow rotary movement in one direction and a quick motion in the opposite direction so as to cause the particles to travel outward between the riffles: and a central mercury and amalgam trap at the center of the pan, substantially as described.

4. In a concentrating-pan having a concave upper surface spiral or evolute riffles on the upper surface of the pan: a track surrounding said riffles at the outer periphery of the pan: distributing-boxes arranged to deliver the pulp between the outermost riffles: means for imparting to said pan an oscillatory motion: a mercury or amalgam trap at the center of said pan and a water-pipe surrounding the outer edge of the pan and adapted to spray the water upon the outer circle of the pan.

5. A concentrating-pan the exterior outline of which is in the form of an evolute said pan being mounted on a pivotal center: a rim surrounding the exterior of the evolute except at the straight line which connects the outer end of the evolute with its commencement: a mercury or amalgam trap at its center: spiral or evolute riffles commencing at the central trap and terminating at intervals on the same circle near the outer edge of the pan: a track surrounding the riffles at the outer periphery of the pan and terminating at the straight line which connects the terminals of the evolute; a water-pipe surrounding the outer rim of the evolute and adapted to deliver a spray of water upon the table and means for imparting to the table a slow oscillating movement in one direction and a quick movement in the opposite direction, substantially as described.

6. In a concentrating-pan a concave upper surface: a mercury or amalgam trap at the center of the pan: spiral riffles surrounding the amalgam-trap: distributing-boxes adapted to deliver the pulp between the outermost riffles of the series: a carpet spread over said riffles with its nap side down and attached at its outer edge to the distributing-boxes so that the pulp will pass underneath it: a water-pipe surrounding the outer edge of the pan and adapted to deliver a spray of water on the outer edge of the pan and means for imparting to the pan a slow oscillating movement in one direction and a quick return movement in the opposite direction, substantially as described.

7. In a circular concentrating-pan having a reciprocating motion, and provided with spiral riffles on its concave upper surface, a central trap consisting of an outer shallow trough and an inner discharge chamber or passage; a partition lower than the outer edge of the trough separating said trough from the discharge-passage; a narrow shelf on top of the partition and projecting into the trough, and a perforated water-pipe below the shelf and adapted to deliver a spray of water into the trough, substantially as described.

8. A concentrating pan or table having a concave upper surface mounted on a center support that permits it to oscillate in a horizontal plane: a mercury and amalgam trap at the center of the table; spiral or evolute riffles secured to the upper surface of said table and opening outwardly toward the periphery of the table: distributing-boxes adapted to deliver the pulp at or near the outer edge of the series of riffles: means for imparting to said pan an oscillatory motion: and a perforated water-pipe surrounding the outer edge of the pan or table.

9. In a concentrating-pan having a concaved upper surface, spiral or evolute riffles extending from points substantially central of the pan toward the periphery thereof: a track surrounding the riffles approximate to the periphery of the pan: means for imparting an oscillatory movement to the pan to cause the particles to travel outward between the riffles, and said pan having a central water and gangue discharge.

10. A concentrating-pan, the exterior outline of which is essentially evolute in outline, said pan having means for centrally supporting it for oscillatory movement in a horizontal plane, and means for oscillating said pan.

11. A concentrating-pan, the exterior outline of which is essentially evolute in outline, said pan having means for centrally supporting it for oscillatory movement in a horizontal plane, spiral riffles on the pan opening outward toward the periphery of the pan, and means for oscillating said pan.

12. A concentrating-pan having a concaved upper surface, the exterior outline of said pan being essentially evolute in outline, the wider and narrower portions of said pan being connected by an approximately radial line, a support for the pan, and means for oscillating said pan.

13. A concentrating-pan, the exterior outline of which is essentially evolute in outline, said pan having means for centrally supporting it for oscillatory movement in a horizontal plane, means for oscillating said pan to cause material to tend to travel around the pan in one direction, and spiral riffles on the pan expanding outward toward the periphery of the pan and extending substantially in the direction of the tendency of travel of the material.

14. A concentrator-table mounted for oscillatory movement in a horizontal plane, spiral riffles on the table expanding outward toward the periphery of the pan, and means to impart an oscillatory movement to the pan to cause the heavier particles on the table to travel between the riffles.

15. A concentrating pan or table having a concaved upper surface and mounted upon a central support for oscillatory movement in a horizontal plane: said table being essentially evolute in outline, riffles on the table having their outer ends relatively more remote from the center of the table than their inner ends are, means for delivering material and water upon the table, and means for giving the table an oscillatory movement.

In witness whereof I have hereunto set my hand.

JOSEPH W. PINDER.

Witnesses:

HENRY P. TRICOU,
S. H. NOURSE.